United States Patent
So et al.

(10) Patent No.: US 10,904,604 B2
(45) Date of Patent: Jan. 26, 2021

(54) METHOD FOR PROVIDING MEDIA SERVICE LIST

(71) Applicant: Samsung Electronics Co., Ltd., Suwon-si (KR)

(72) Inventors: Young-Wan So, Gunpo-si (KR); Dong-Yeon Kim, Seoul (KR); Kyung-Mo Park, Seoul (KR); Jae-Hyeon Bae, Seoul (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/304,422

(22) PCT Filed: May 26, 2017

(86) PCT No.: PCT/KR2017/005555
§ 371 (c)(1),
(2) Date: Nov. 26, 2018

(87) PCT Pub. No.: WO2017/204602
PCT Pub. Date: Nov. 30, 2017

(65) Prior Publication Data
US 2019/0281339 A1    Sep. 12, 2019

(30) Foreign Application Priority Data

May 26, 2016 (KR) .................. 10-2016-0065144
Jan. 16, 2017 (KR) .................. 10-2017-0007335

(51) Int. Cl.
H04N 21/278      (2011.01)
H04N 21/262      (2011.01)
H04N 21/2668     (2011.01)

(52) U.S. Cl.
CPC ....... *H04N 21/278* (2013.01); *H04N 21/2668* (2013.01); *H04N 21/26291* (2013.01)

(58) Field of Classification Search
CPC ............ H04N 21/278; H04N 21/2629; H04N 21/2668
See application file for complete search history.

(56) References Cited

U.S. PATENT DOCUMENTS

2005/0283799 A1* 12/2005 Domegan .......... H04N 5/44543
                                                         725/38
2013/0174188 A1*  7/2013 Gagnon ............... H04N 21/254
                                                         725/13

(Continued)

FOREIGN PATENT DOCUMENTS

KR        10-0863358 B1     10/2008
KR     10-2011-0039520 A     4/2011

(Continued)

*Primary Examiner* — Nasser M Goodarzi
*Assistant Examiner* — Adil Ocak
(74) *Attorney, Agent, or Firm* — Jefferson IP Law, LLP

(57) ABSTRACT

A method for providing a media service list to a user according to an embodiment of the present disclosure comprises the steps of: acquiring location information of at least one media service list; receiving the at least one media service list on the basis of the location information; generating an integrated media service list by integrating the received at least one media service list; and providing the integrated media service list to a user.

14 Claims, 5 Drawing Sheets

(56) References Cited

U.S. PATENT DOCUMENTS

| | | | |
|---|---|---|---|
| 2013/0340017 A1* | 12/2013 | Rozeslaniec | H04N 21/26283 |
| | | | 725/110 |
| 2014/0229993 A1 | 8/2014 | Lee et al. | |
| 2015/0074725 A1* | 3/2015 | Hale | H04N 21/4345 |
| | | | 725/49 |
| 2016/0127783 A1 | 5/2016 | Garcia Navarro | |

FOREIGN PATENT DOCUMENTS

| | | |
|---|---|---|
| KR | 10-2013-0118017 A | 10/2013 |
| KR | 10-1351017 B1 | 1/2014 |
| KR | 10-2014-0102061 A | 8/2014 |

\* cited by examiner

METHOD FOR PROVIDING MEDIA SERVICE LIST

CROSS-REFERENCE TO RELATED APPLICATION(S)

This application is a National Stage application of an International application No. PCT/KR2017/005555, which was filed on May 26, 2017, and claims priority to Korean patent applications filed on May 26, 2016 and Jan. 16, 2017 in the Korean Intellectual Property Office and assigned Serial No. 10-2016-0065144 and 10-2017-0007335 respectively, the entire disclosure of each of which is hereby incorporated by reference.

TECHNICAL FIELD

The present disclosure relates to a method for providing a media service list.

BACKGROUND ART

In existing broadcasting systems, a specific broadcasting operator (e.g., Korean Broadcasting System (KBS) and Munwha Broadcasting Corporation (MBC)) creates, on its own, a service list such as an electronic program guide (EPG), interactive program guide (IPG), electronic service guide (ESG), or the like, and then transmits the service list along with content to users. Alternatively, a multichannel video programming distributor (MVPD) (e.g., SK Broadband and Olleh KT), which is a paid retransmission operator that receives content from the broadcasting operator and retransmits the received content, configures a service list, and transmits the service list to users. That is, a user receives an ESG that has been created and distributed by a specific retransmission operator to which the user has subscribed for a paid-for service, or by a terrestrial broadcasting company, and selects the intended broadcasting program or information about the sequence of programs to be broadcast on the basis of the received ESG.

Recently, broadcasting content has often been provided to users by Internet protocol (IP)-based Internet streaming. If this trend continues, it may be that all broadcasting content is IP-based, as in the case of the upcoming era of All-IP broadcasting. Compared to a traditional broadcasting scheme in which a fixed small number of broadcasting channels are provided to users, it is expected that the number of broadcasting channels provided to users will increase infinitely. In this context, there is a need for a method to efficiently provide ESGs created by various business operators.

DETAILED DESCRIPTION OF THE INVENTION

Technical Problem

An embodiment of the present disclosure provides a method for providing a user with a user-oriented integrated media service list that is not dependent on any service provider.

An embodiment of the present disclosure provides a method for providing a user with a media service list including the type of user channel on which a media package is consumed.

An embodiment of the present disclosure provides a method for requesting a media package of an indicated channel type on the basis of a channel available to a terminal.

An embodiment of the present disclosure provides a method of integrating media service lists according to a media channel type, and providing the integrated media service list to a user.

An embodiment of the present disclosure provides a method for providing update information about services included in a media service list to a terminal.

Technical Solution

According to an embodiment of the present disclosure, a method of providing a media service list includes acquiring location information about at least one media service list, receiving the at least one media service list on the basis of the location information, generating an integrated media service list by integrating the received at least one media service list, and providing the integrated media service list to a user. According to an embodiment of the present disclosure, a method of providing a media service list includes generating a media service list including one or more media packages each corresponding to one program, one or more media channels each being a logical group of one or more media packages, and a channel type, channel-Type providing the channel type required for consuming a service included in a media channel, and transmitting the generated media service list to a terminal.

Advantageous Effects

According to an embodiment of the present disclosure, broadcasting service information integrated into one application can be acquired.

According to an embodiment of the present disclosure, a user terminal can merge broadcasting service information provided by a plurality of service providers, and provide the merged broadcasting service information to a user. The broadcasting service information may not be dependent on any specific broadcasting operator.

According to an embodiment of the present disclosure, user-oriented integrated broadcasting service information can be provided.

According to an embodiment of the present disclosure, a media service list including the type of used channel on which a media package is consumed can be provided to a user.

According to an embodiment of the present disclosure, a media package of an indicated channel type can be requested on the basis of a channel available to a terminal.

According to an embodiment of the present disclosure, media service lists can be integrated according to a media channel type, and provided to a user.

According to an embodiment of the present disclosure, update information about services included in a media service list can be provided to a terminal.

MODE FOR CARRYING OUT THE INVENTION

Figure 1:
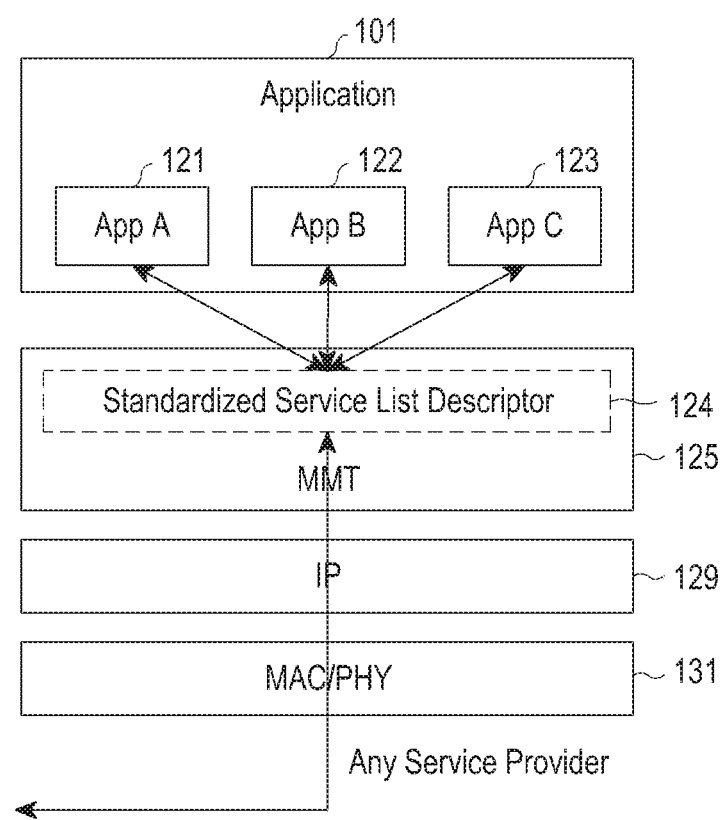
FIG. 1 is a view illustrating the concept of providing broadcasting service information to a user according to an embodiment of the present disclosure.

The operation principle of preferred embodiments of the present disclosure will be described below in detail with reference to the attached drawings. Like reference numerals denote the same components as much as possible even though the components are illustrated in different drawings. A detailed description of a generally known function or structure of the present disclosure will be avoided lest it should obscure the subject matter of the present disclosure. Although the terms used in the present disclosure are defined in consideration of functions in the embodiments of the present disclosure, the terms may be changed according to the intention of a user or an operator, or customs. Therefore, the definitions should be made, not simply by the actual terms used but by the meanings of each term lying within.

Embodiments of the present disclosure will be described below in the context of an MPEG media transport (MMT) broadcasting system. However, the MMT broadcasting system is taken for the convenience of description, not limiting the present disclosure.

Hereinbelow, the terms "(MMT) service list", "(MMT) service descriptor", "(MMT) service list descriptor", and "descriptor" are used in the same meaning, and thus interchangeable with each other. Further, the terms "electronic service guide (ESG)", "electronic program guide (EPG)", and "interactive program guide (IPG)" are used in the same meaning, and thus interchangeable with each other. In the following description, an MMT sending entity may be an MMT sending entity of a broadcasting operator or a service provider, or a separate server that stores an MMT service list. The terms, MMT sending entity and (MMT service list storage) server may be interchangeably used. In the following description, an MMT receiving entity may be included in a user terminal, or may be wiredly/wirelessly connected to the user terminal. The terms, MMT receiving entity and (user) terminal may be interchangeably used. The terminal may be a terminal having a display, such as a TV terminal, a hand-held phone, a laptop computer, or the like.

FIG. 1 is a view illustrating the concept of providing broadcasting service information to a user according to an embodiment of the present disclosure.

In the present disclosure, a plurality of pieces of broadcasting service information are integrated into one piece of broadcasting service information, and provided to a user. FIG. 1 illustrates the hierarchical structure of a user terminal, referred to for describing the steps for transmitting broadcasting service information to a user by the user terminal. Although the user terminal may further include one or more additional layers other than the layers illustrated in FIG. 1, the one or more additional layers are not shown in FIG. 1 for the convenience of description. Referring to FIG. 1, information about broadcasting services, generated by one or more service providers, may be received by an MMT receiving entity 125 through lower layers 131 and 129, and integrated into a single service list descriptor 124. The single integrated service list descriptor 124 may be provided to the user through user applications 121, 122, and 123 of a higher layer 101 of the MMT receiving entity 125. Since a plurality of pieces of broadcasting service information have been integrated into the single service list descriptor 124, the same service list descriptor 124 may be provided to the plurality of user applications 121, 122 and 123. Accordingly, the user may acquire the integrated broadcasting service information simply through one application. Broadcasting service information configured by a service provider is not simply received and viewed. Instead, the user terminal merges broadcasting service information provided by a plurality of service providers. Thus, the broadcasting service information may not be dependent on any specific broadcasting operator. Further, the user may view the integrated broadcasting service information by executing only one application, without the need for executing an application of a specific service provider to view broadcasting service information from the specific service provider, and additionally executing an application of another service provider to view broadcasting service information from the corresponding service provider. That is, according to the present disclosure, user-oriented integrated broadcasting service information can be provided.

Now, a description will be given of the structure of an MMT service list according embodiments of the present disclosure.

The terms, "(MMT) service list", "(MMT) service descriptor", "(MMT) service list descriptor", and "descriptor" are used in the same meaning, and thus are interchangeable with each other.

Figure 2:
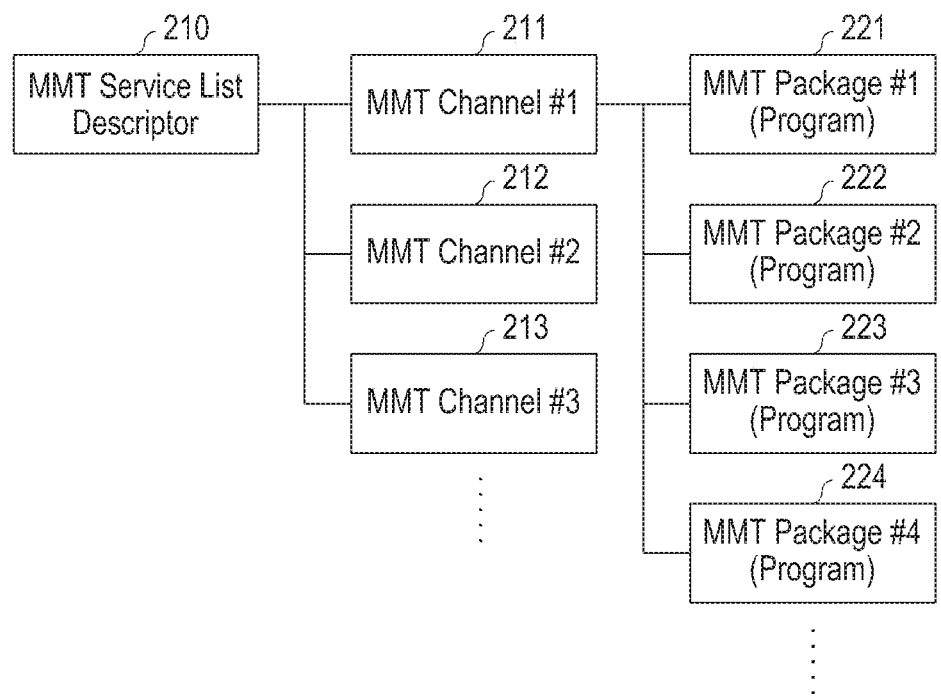
FIG. 2 is a view illustrating an MPEG media transport (MMT) service list descriptor data model according to an embodiment of the present disclosure.

FIG. 2 is a view illustrating an MMT service list descriptor data model according to an embodiment of the present disclosure.

Referring to FIG. 2, one MMT service list descriptor 210 may include one or more MMT channels, MMT Channel #1, MMT Channel #2, MMT Channel #3, . . . 211, 212, 213, . . . , and one MMT channel may include one or more MMT packages, MMT Package #1, MMT Package #2, MMT Package #3, MMT Package #4 . . . 221, 222, 223, 224, . . . . One MMT package includes information about one broadcasting content program (e.g., any one of a variety show, a news, a broadcast of a baseball game, etc.), and one MMT channel includes information about a transmission channel (e.g., Munwha Broadcasting Corporation (MBC), Seoul Broadcasting System (SBS), Korean Broadcasting System (KBS), Cable News Network (CNN), Netflix, Hulu, etc.) that carries an aggregate of one or more broadcasting content programs. That is, the MMT service list descriptor 210 may include a transmission channel list including one or more transmission channels, and a content program list including one or more content programs.

One MMT service list may be provided by one specific broadcasting operator, and one specific broadcasting operator may provide a plurality of MMT service lists. An MMT receiving entity may acquire location information (e.g., a descriptor URL) about the descriptor, determined by a provider of the MMT service list descriptor 210, and may acquire the MMT service list descriptor 210 from the location information. The MMT receiving entity may receive one or more MMT service lists, and integrate the MMT service lists into a single MMT service list. According to some embodiments, the location information may exist in an MMT sending entity. The MMT sensing entity may provide the location information to the MMT receiving entity. According to other embodiments, the location information may exist in a separate server that provides the MMT service list descriptor 210, and the server may provide the location information to the MMT receiving entity.

In the MMT service list descriptor 210, an MMT channel may be a linear or non-linear broadcasting channel. A linear broadcasting channel is a channel including content programs scheduled to be broadcast. In the case of a linear broadcasting channel, one MMT package may additionally include time attribute information about a specific time at which the MMT package is broadcast. For example, the MMT package may include attribute information of the broadcasting start time and end time of the package, StartTime and EndTime, respectively.

The MMT receiving entity may receive a plurality of MMT service list descriptors 210 from a plurality of broadcasting operators. The MMT receiving entity may acquire the MMT service list descriptors 210 including lists of MMT services from location information (e.g., descriptor URLs) about the plurality of descriptors. An MMT service may include one or more MMT packages and/or one or more MMT channels. The MMT receiving entity may merge the acquired plurality of MMT service list descriptors 210, and provide the merged MMT service list descriptor to the user. The merged MMT service list that has been provided to the user may serve as an ESG.

An MMT service list descriptor 210 may provide information about an MMT service provided in the form of an MMT protocol by a specific broadcasting service provider. One MMT service list descriptor 210 may include information about one or more MMT channels 211, 212 and 213, and each MMT channel may be a logical unit including information about an aggregate of one or more MMT packages 221, 222, 223, and 224. An MMT package may include information about one specific content program such as the news, a sports game, a movie, or the like, and one MMT package may include a unique identifier (ID) attribute value, MMT_Package_id in order to be distinguished from other MMT packages.

Now, a description will be given of an MMT service list schema.

The MMT service list descriptor 210 is configured in units of an MMT package, and one MMT package includes one or more assets. One MMT channel may include an aggregate of one or more MMT packages, and a list of these MMT channels and MMT packages may be provided as an ESG, EPG, an IPG, or the like to the user.

[Table 1] and [Table 2] below illustrate an exemplary MMT service list descriptor schema. Although [Table 1] and [Table 2] are continuous, they are shown as two separate tables in view of the limited area.

TABLE 1

```
<?xml version="1.0" encoding="UTF-8"?>
<xs:schema            xmlns:xs="http://www.w3.org/2001/XMLSchema"
elementFormDefault="unqualified" version="1.0">
    <xs:element                             name="MMTServiceDescriptor"
type="xMMTServiceDescriptor"/>
    <xs:complexType name="xMMTServiceDescriptor">
        <xs:sequence>
            <xs:element name="MMTChannel" type="xMMTChannel"/>
<xs:any    namespace="##other"    processContents="lax"    minOccurs="0"
maxOccurs="unbounded"/>
</xs:sequence>
    <xs:attribute name="version" type="xs:decimal" use="required"/>
    <xs:attribute name="descriptorURL" type="xs:anyURI"/>
    <xs:attribute name="descriptorProvider" type="xs:string"/>
    <xs:attribute          name="duration"          type="xs:nonNegativeInteger"
minOccurs="0"/>
    <xs:anyAttribute namespace="##any"/>
    </xs:complexType>
    <xs:complexType name="xMMTChannel">
        <xs:sequence>
            <xs:choice maxOccurs="unbounded">
                <xs:element name="name" type="xs:string"/>
                <xs:element name="link" type="xs:anyURI"/>
<xs:element name="channelDescription" type="xs:string"/>
<xs:element name="releaseDate" type="dateTime" minOccurs="0"/>
            <xs:element name="lastBuildDate" type="dateTime" minOccurs="0"/>
<xs:any    namespace="##other"    processContents="lax"    minOccurs="0"
maxOccurs="unbounded"/>
            </xs:choice>
            <xs:element         name="MMTPackage"         type="xMMTPackage"
maxOccurs="unbounded"/>
                <xs:any namespace="##other"  processContents="lax"  minOccurs="0"
maxOccurs="unbounded"/>
</xs:sequence>
<xs:attribute name="channelType" type="xs:decimal" use="required"/>
<xs:anyAttribute namespace="##any"/>
</xs:complexType>
```

TABLE 2

```
<xs:complexType name="xMMTPackage">
    <xs:sequence>
        <xs:choice maxOccurs="unbounded">
<xs:element name="title" minOccurs="0"/>
<xs:element name="packageDescription" minOccurs="0"/>
<xs:element name="MMT_Package_id" type="xs:string"/>
```

TABLE 2-continued

```
    <xs:element name="startTime" type="dateTime" minOccurs="0"/>
    <xs:element name="endTime" type="dateTime" minOccurs="0"/>
    <xs:element name="SDPURI" type="xs:anyURI"/>
    <xs:element name="SDP" type="SDPType"/>
    <xs:element name="MMT_PA_message_URL" type="xs:anyURI"/>
    <xs:SimpleType name="SDPType">
    <!--- Note: the InlinedSDP below must be embedded in a CDATA section -->
    <restriction base="string"/>
    </xs:SimpleType>
        <xs:any    namespace="##other"    processContents="lax"    minOccurs="0"
maxOccurs="unbounded"/>
    </xs:choice>
        </xs:sequence>
        <xs:anyAttribute namespace="##any"/>
    </xs:complexType>
</xs:schema>
```

The elements of the MMT service list descriptor schema illustrated in [Table 1] and [Table 2] are described in [Table 3] below.

TABLE 3

MMTServiceDescriptor - The element provides information on MMT services that
   will be provided with MMTP from a specific service provider
version - A version of MMTServiceDescriptor
descriptorURL - The URL of corresponding to MMTServiceDescriptor
descriptorProvider - MMT service descriptor information provider.
duration - Time indicating how long a descriptor information can be kept before
   updating from the source
MMTChannel - A logical entity which is a group of MMT packages
name - The name of the channel.
link-The HTML page URL about the corresponding channel.
channelDescription - Description on the corresponding channel
releaseDate - The release date for the channel information
lastBuildDate - The last time the program content of the channel changed.
MMTPackage - A specific program which corresponds to a MMT package
channelType - The type of corresponding channel. It means which kind of
   transport channels are required to consume services described in this
   channel.

| channel Type Value | Description |
|---|---|
| 0 | broadband channel access only. |
| 1 | broadcast channel access only |
| 2 | both of broadband and broadcast channel access. |
| 3– | reserved for future use | title - The name of the program with corresponding MMT Package
packageDescription - Description on the corresponding package
MMT_Package jid -This value is a unique identifier of the Package.
startTime - The start time of a corresponding MMT package if it is a scheduled
   content, e.g. linear contents. If it is a non-linear content, starTime information
   should be omitted.
endTime - The end time of a corresponding MMT package if it is a scheduled
   content, e.g. linear contents. If it is a non-linear content, endTime information
   should be omitted.
SDPURI - URI referring to a content referencing SDP file containing information
   that the MMT receiving entity needs in order to be able to receive and
   consume the content of the MMT Package. This content referencing SDP file
   is transported in a HTTP.
SDP - In-lined content referencing SDP file containing information that the MMT
   receiving entity needs in order to be able to receive and consume the content
   of the MMT Package.
MMT_PA_message_URL - URI referring to a MMT PA (Package Access) message
   or PA table for the corresponding MMT Package.

In the MMT service list descriptor schema illustrated in [Table 1] and [Table 2], "descriptorURL" is an address value at which a corresponding MMT service list is located before the MMT receiving entity receives the MMT service list. The MMT receiving entity may acquire one or more descriptorURLs, and store the acquired descriptorURLs. For example, the user may detect the descriptorURLs of one or more MMT service lists through a specific path, and store descriptorURL information of a preferred business operator from among the descriptorURLs. In some embodiments, descriptorURL may be provided as separate means information that provides information about a service list in the service list, such as an EPG transmitted on a separate broadcasting physical channel. The MMT receiving entity may transmit a request for the MMT service list to the address of the descriptorURL in order to acquire the MMT service list. The MMT receiving entity may receive the MMT service list according to the request. The MMT receiving entity may receive one or more MMT service lists, integrate the received MMT service lists, and provide the integrated MMT service list to the user.

Meanwhile, channelType in the MMT service list schema provides type information about a corresponding channel. That is, channelType provides type information about an MMT channel included in the MMT service list. channelType provides type information about a physical transmission channel required to consume a service (MMT package) described in the corresponding channel. The MMT sending entity may transmit the MMT service list by tagging channelType to the MMT service list. When integrating one or more MMT service lists, the MMT receiving entity may consider channelType. That is, the MMT receiving entity may integrate only MMT channels that can be used in the terminal in one or more received MMT service lists by comparing available physical channels of the terminal with channelType. For example, if the terminal is placed in a state where the terminal is capable of using only a broadband channel, the MMT receiving entity integrates only channels with channelType set to 0, and provides the integrated channels to the user. As such, the MMT receiving entity may provide only a list of services currently available to the user on the basis of the received channelType tagged to the MMT service list.

The structure of an MMT receiving entity, according to an embodiment of the present disclosure, will be described below.

Figure 3:
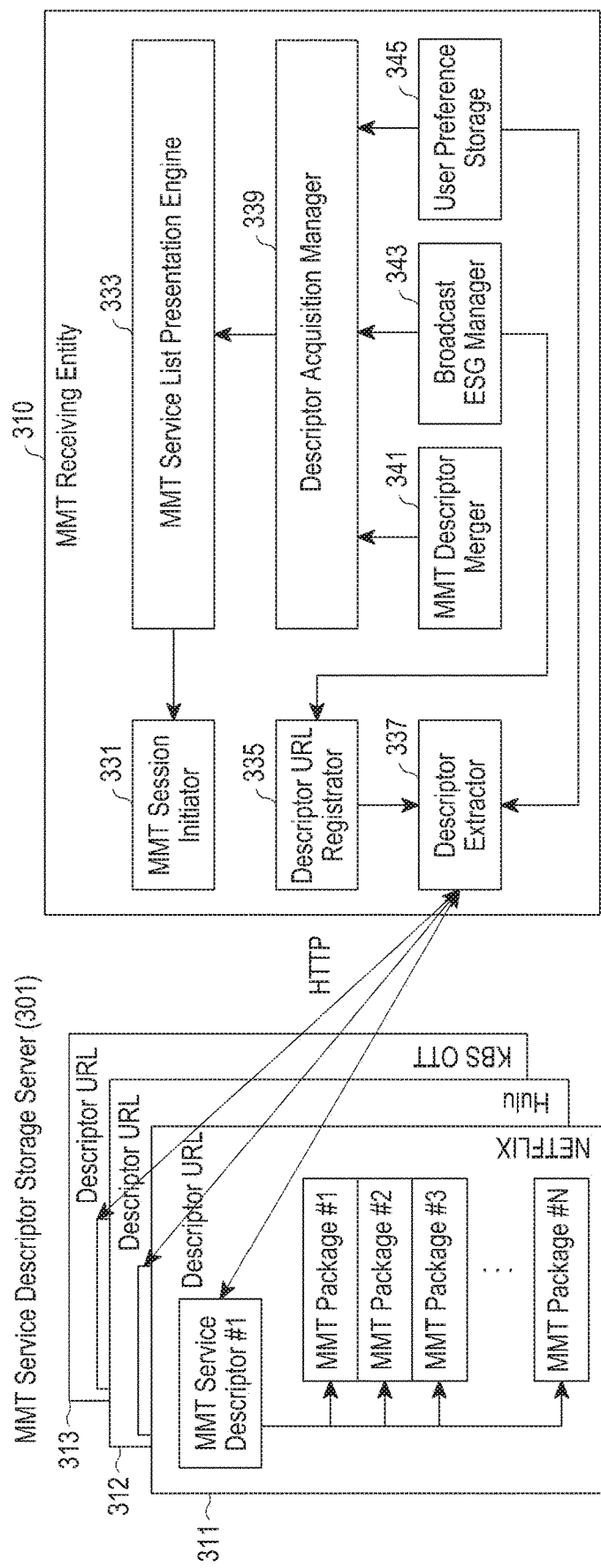
FIG. 3 is a view illustrating the structure of an MMT receiving entity according to an embodiment of the present disclosure.

FIG. 3 is a view illustrating the structure of an MMT receiving entity according to an embodiment of the present disclosure. The terms "(MMT) service list", "(MMT) service descriptor", "(MMT) service list descriptor", and "descriptor" are used in the same meaning, and thus interchangeable with each another.

FIG. 3 is a schematic diagram of an embodiment in which an MMT service descriptor storage server 301 transmits a plurality of MMT service descriptors 311, 312 and 313 to an MMT receiving entity 310, and the MMT receiving entity 310 processes the received MMT service descriptors 311, 312, and 313. The MMT service descriptor storage server 301 may be an MMT sending entity of a broadcasting operator, or a separate server. Now, a detailed description will be given of components of the MMT receiving entity 310.

The MMT receiving entity 310 includes an MMT session initiator 331, a descriptor URL registrator 335, a descriptor extractor 337, an MMT descriptor merger 341, a broadcast ESG manager 343, user preference storage 345, a descriptor acquisition manager 339, and an MMT service list presentation engine 333.

The descriptor URL registrator 335 may store location information about an MMT service list descriptor, descriptorURL. The MMT receiving entity 310 may acquire location information about the descriptor from an information provider of the intended MMT service list descriptor, and pre-store the location information in the descriptor URL registrator 335.

The MMT service list descriptor may be stored directly in a separate application that the user has installed in the user terminal and provided to the user. Further, the MMT service list descriptor may be transmitted from a server on the Internet to the MMT receiving entity 310.

The MMT service list descriptor may be provided in alternative URL information received usually on a broadcasting channel through the broadcast ESG manager 343. A broadcasting company or a service provider may usually provide alternative URL information of a broadcasting channel in a case in which a broadcasting service is impossible even though a broadband channel is available, such as a case in which the MMT receiving entity fails to receive a broadcasting channel and thus cannot extract an ESG.

The descriptor extractor 337 may receive one or more MMT service descriptors from the MMT service descriptor storage server 301 located on the Internet by using the location information about the MMT service list descriptors received from the descriptor URL registrator 335. To receive the MMT service descriptors, various transmission protocols (e.g., hypertext transfer protocol (HTTP) and so on) may be used.

Which of a plurality of MMT service descriptors to be received may be determined according to a user preference preset by the user. One or more received MMT service descriptors may be provided to the MMT descriptor merger 341.

The MMT descriptor merger 341 may merge a plurality of MMT service list descriptors 311, 312 and 313 received from a plurality of MMT service descriptor storage servers. Meanwhile, whether to receive an MMT service list descriptor of a specific broadcasting operator (e.g., KBS or MBC) and from which to receive the MMT service list descriptor (e.g., KBS, or a 3rd party provider) may be determined by the user, and may be stored in the user preference storage 345. The MMT service list descriptors may be merged into one integrated MMT service list descriptor on the basis of corresponding preference information and then provided to the user.

The broadcast ESG manager 343 extracts service list information (e.g., an ESG or the like) that a traditional broadcasting system such as Advanced Television Systems Committee (ATSC) 3.0 or Digital Video Broadcasting (DVB) provides separately in a lower layer, that is, a broadcasting physical/transmission (PHY/MAC) layer. If the terminal is not within broadcasting channel coverage for some reason and thus has difficulty receiving a broadcasting service, the broadcast ESG manager 343 may provide status information about the broadcasting channel (e.g., ESG unavailable) instead of ESG information. Thus, the descriptor acquisition manager 339 may determine an ESG (or service descriptor) received from the path to be provided to the user.

The user preference storage 345 may include information about a user-preferred MMT service descriptor, a user-preferred channel, a user-preferred package, etc. The information may be used in determining which descriptor is to be provided to the user.

When the MMT receiving entity 310 provides service list information to the user, the descriptor acquisition manager 339 may determine which path is to be used. The path in which the service list is provided may be determined on the basis of information provided by the broadcast ESG manager 343 or the user preference storage 345. In a broadcasting system such as ATSC 3.0 or DVB, service list information (e.g., ESG) is extracted from the lower PHY/MAC layer. However, since a mobile terminal for which broadcasting service reception is impossible cannot receive an ESG, which is transmitted only on a broadcasting channel, it may be impossible for the mobile terminal to start a broadcasting service. The descriptor acquisition manager 339 enables starting the broadcasting service for the user by providing the MMT service list information received from the MMT descriptor merger 341 to the user.

The MMT service list presentation engine 333 may render the service list information acquired through the MMT service list descriptor, and provide the rendered service list information to the user. The user may select a specific intended program (e.g., MMT package) on the basis of the service list information.

The MMT session initiator 311 may extract MMT session information about the user-selected specific program (i.e., MMT package) from the service list information provided to the user through the MMT service list presentation engine 333, and process an MMT session by using the extracted MMT session information, so that the specific program (i.e., MMT package) may be received from the MMT sending entity. Corresponding MPEG media transport protocol (MMTP) session information about the user-selected specific program (i.e., MMT package) may be provided in one of an MMT package access (PA) table, an MMT PA message (provided in an MMT_PA_URL element), an inlined session description protocol (SDP) embedded in the descriptor (provided in a character data (CDATA) field of a descriptor extensible markup language (XML) document), and a separate session description protocol (SDP) file (a URI of the SDP file (SDPURI) element provides location information). The MMT session information is provided to the MMT session initiator 331. The MMT session information may be information required to initiate the session in order to allow the user to receive the intended content program by MMT.

The MMT PA table may be a table including all related signaling information required to consume the MMT package. The MMT PA table may include information to be processed in first in order to acquire the MMT package, and provide the acquired MMT package to the user. The syntax and semantics of the MMT PA may be the same as defined in the following MMT standard. Meanwhile, the MMT PA table may be delivered in the form of a PA signaling message.

[Table 4] illustrates the syntax of the MMT PA table.

TABLE 4

| Syntax | Value | No. of bits | Mnemonic |
|---|---|---|---|
| PA_table ( ) { | | | |
|   table_id | | 8 | uimsbf |
|   version | | 8 | uimsbf |
|   length | | 16 | uimsbf |
|   information_table_info { | | | |
|     number_of_tables | N1 | 8 | uimsbf |
|     for (i=0; i<N1; i++) { | | | |
|       signalling_information_table_id | | 8 | uimsbf |
|       signalling_information_table_version | | 8 | uimsbf |
|       location { | | | |
|         MMT_general_location_info( ) | | | |
|       } | | | |
|       reserved | '1111 111' | 7 | bslbf |
|       alternative_location_flag | | 1 | bslbf |
|       if (alternative_location_flag == 1) { | | | |
|         alternative_location { | | | |
|           MMT_general_location_info( ) | | | |
|         } | | | |
|       } | | | |
|     } | | | |
|   } | | | |
|   reserved | | | |
|   private_extension_flag | | 7 | bslbf |
|   if (private_extension_flag == 1) | '1111 111' | 1 | bslbf |
|     private_extension { | | | |
|     } | | | |
|   } | | | |
| } | | | |

The semantics of the elements listed in [Table 4] is described in [Table 5].

TABLE 5

[Semantics]
table_id - indicates the identifier of the PA table.
version - indicates the version of the PA table. The newer version obsoletes the information in any older version.
length - indicates the length of the PA table in bytes, counting from the beginning of the next field to the last byte of the PA table. The value '0' is not valid for this field.
number_of_tables - indicates the number of signalling tables whose information are provided in this PA table.
signalling_information_table_id - indicates the ID of a signalling table whose information are provided in this PA table.
signalling_information_table_version - indicates the version of a signalling table whose information are provided in this PA table.
MMT_general_location_info - provides the location of a signalling table whose information are provided in this PA table. Syntax and semantics of MMT_general_location_info are defined in 9.6.1.
  alternative_location_flag - if this flag is set to '1 ', an alternative address from where an MMT receiving entity can get the information table is provided.
MMT_general_location_info_alternative_location - provides the information of an alternative address from where an MMT receiving entity can get the signalling table. Only location_type from '0x07'to '0x0B'shall be used in MMT_general_location_info for second location.
  private_extension_flag - if this flag is '1', the private extension is present.
  private_extension - a syntax element group serving as a container for proprietary or application-specific extensions.

Hereinbelow, an operation of an MMT receiving entity according to an embodiment of the present disclosure will be described.

Figure 4:
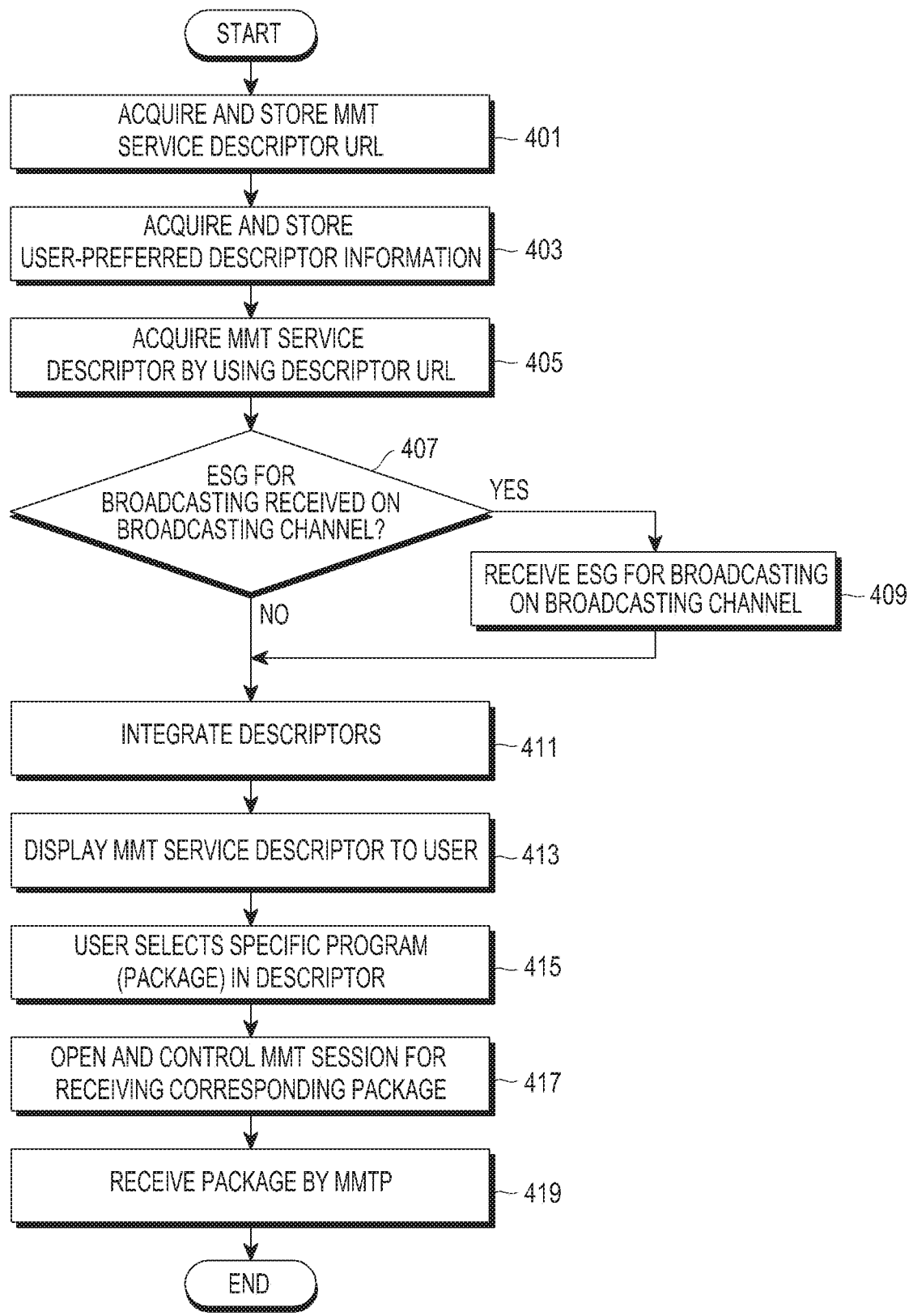
FIG. 4 is a view illustrating an operation of an MMT receiving entity according to an embodiment of the present disclosure.

FIG. 4 is a view illustrating an operation of an MMT receiving entity according to an embodiment of the present disclosure.

The MMT receiving entity may acquire URLs of one or more MMT service list descriptors, and store the acquired URLs therein in operation 401. The MMT receiving entity may acquire and store information about user-preferred MMT service list descriptors in operation 403. The MMT receiving entity may receive one or more MMT service list descriptors by using the acquired URLs of the one or more MMT service list descriptors in operation 405. The MMT receiving entity may determine whether an ESG can be received on a broadcasting channel in operation 407. If the ESG can be received, the MMT receiving entity may receive the ESG on the broadcasting channel in operation 409, and determine the type of reception channel in operation 411. If the ESG cannot be received on the broadcasting channel, the MMT receiving entity may directly determine the type of the reception channel in operation 411. Determining the type of the reception channel may amount to determining the channelType of a physical channel receivable at a terminal including the MMT receiving entity or a terminal connected wiredly/wirelessly to the MMT receiving entity. The MMT receiving entity may classify channels of a specific channel type, the channelType included in the received MMT service list descriptors or ESG according to the physical channel availability of the terminal in operation 413. The MMT receiving entity may integrate MMT service list descriptors of the classified channels of the same channel type, thus generating an integrated MMT service list descriptor in operation 415. The MMT receiving entity may display the integrated MMT service list descriptor to a user in operation 417. If the user selects a specific program (MMT package) in the MMT service list descriptor in operation 419, the MMT receiving entity may open an MMT session for receiving the selected MMT package, and control the opened session in operation 421. The MMT receiving entity may receive the selected MMT package in the MMT session by an MMTP in operation 423.

An operation of an MMT sending entity, according to an embodiment of the present disclosure, will be described below.

Figure 5:
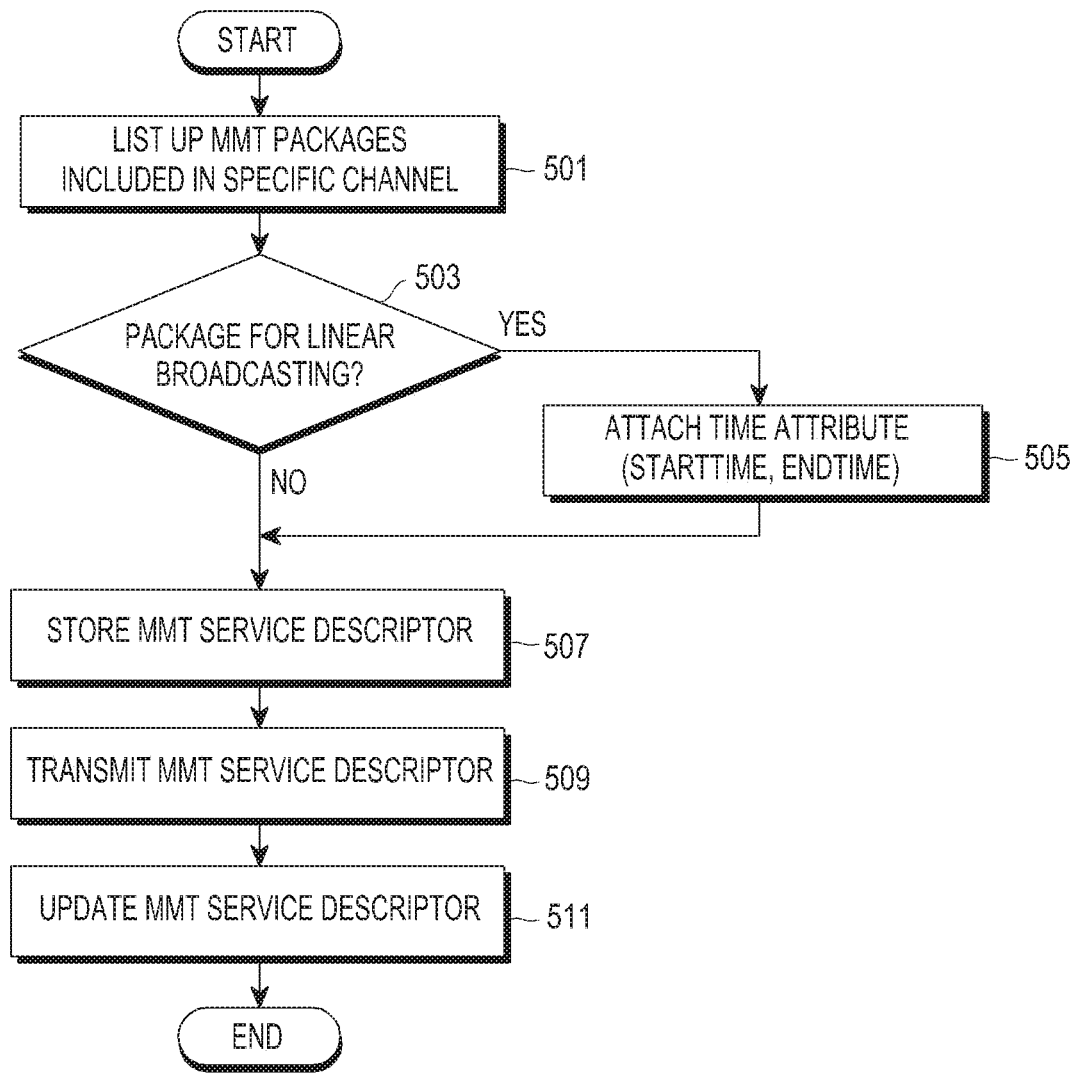
FIG. 5 is a view illustrating an operation of an MMT sending entity according to an embodiment of the present disclosure.

FIG. 5 is a view illustrating an operation of an MMT sending entity according to an embodiment of the present disclosure.

The MMT sensing entity may list MMT packages included in a specific channel in operation 501. The MMT sending entity may determine whether the channel is a channel for linear broadcasting in operation 503. If the channel is a channel for linear broadcasting, the MMT sending entity may include, in the packages of the channel, time attribute information, StartTime and EndTime, about specific times when the packages are broadcast in operation 505, and store an MMT service list descriptor in operation 507. If the channel is a channel for non-linear broadcasting, the MMT sending entity may directly store the MMT service list descriptor in operation 507. The MMT sending entity may transmit the stored MMT service list descriptor to an MMT receiving entity in operation 509. When needed, the MMT sending entity may update the MMT service list descriptor. The embodiments of the present disclosure have been described so far. In an existing broadcasting system (e.g., ATSC 1.0), a terminal, which is not capable of receiving broadcasting on a broadcasting channel, cannot receive an ESG transmitted only on a broadcasting channel. Therefore, it is impossible to start a broadcasting service on the terminal. Further, compared to an existing broadcasting system centered on in-home fixed TVs, emerging hybrid broadcasting systems (e.g., ATSC3.0 or DVB), with broadcasting and communication converged therein, provide services to various devices such as mobile terminals. In the hybrid broadcasting service provided to mobile terminals, a mobile terminal may be located out of service coverage, as is the case when entering a shadow area of the broadcasting service. In this case, the terminal may not extract an ESG. Therefore, it may be that even though a broadband channel is available to the terminal, the broadcasting service itself is impossible for the terminal. According to embodiments of the present disclosure, however, even a terminal that is not capable of directly receiving broadcasting service information of a broadcasting channel may provide user-oriented integrated broadcasting service information to a user because the terminal may integrate a plurality of pieces of broadcasting service information provided by a plurality of broadcasting service providers and provide the integrated broadcasting service information to the user. An apparatus and method for requesting an MMT service list from an MMT sending entity by an MMT receiving entity, according to an embodiment of the present disclosure, will be described below.

Type information, channelType, about a transmission channel (e.g., BB, BC, or both) required to consume each channel (e.g., KBS and MBC) may be provided, tagged as attribute information about the individual channel, to an MMT service list, as described before. However, the MMT receiving entity may specifically request an MMT service list optimized for a specific delivery channel type in order to efficiently and selectively receive MMT service list information. Accordingly, the MMT receiving entity may receive only an MMT service list optimized for available channels of a terminal.

Further, the MMT service list may be transmitted to the MMT receiving entity through out of band signaling by HTTP. [Table 6] and [Table 7] illustrate an exemplary MMT service list schema. Although [Table 6] and [Table 7] are separately shown for the convenience of description, they are actually one table.

TABLE 6

```
<?xml version="1.0" encoding="UTF-8"?>
<xs:schema xmlns:xs="http://www.w3.org/2001/XMLSchema"
elementFormDefault="unqualified" version="1.0">
    <xs:element name="MMTServiceList" type="MMTServiceListType"/>
    <xs:complexType name="MMTServiceListType">
        <xs:sequence>
            <xs:element name="MMTChannel" type="MMTChannelType"/>
            <xs:any namespace="##other" processContents="lax" minOccurs="0"
maxOccurs="unbounded"/>
        </xs:sequence>
```

TABLE 6-continued

```
    <xs:attribute name="version" type="xs:decimal" use="required"/>
    <xs:attribute name="descriptorURL" type="xs:anyURI"/>
    <xs:attribute name="descriptorProvider" type="xs:string"/>
    <xs:attribute name="duration" type="xs:nonNegativeInteger" minOccurs="0"/>
    <xs:anyAttribute namespace="##any"/>
</xs:complexType>
<xs:complexType name="MMTChannelType">
    <xs:sequence>
      <xs:choice maxOccurs="unbounded">
        <xs:element name="name" type="xs:string"/>
        <xs:element name="link" type="xs:anyURI"/>
          <xs:element name="channelDescription" type="xs:string"/>
            <xs:element name="releaseDate" type="dateTime" minOccurs="0"/>
          <xs:element name="lastBuildDate" type="dateTime" minOccurs="0"/>
            <xs:any namespace="##other" processContents="lax" minOccurs="0"
maxOccurs="unbounded"/>
      </xs:choice>
      <xs:element name="MMTPackage" type="MMTPackageType" maxOccurs="unbounded"/>
      <xs:any namespace="##other" processContents="lax" minOccurs="0"
maxOccurs="unbounded"/>
    </xs:sequence>
    <xs:attribute narne="deliveryChannelType" type="xs:decimal" use="required"/>
    <xs:attribute name="channelID" type="xs:decimal" use="required"/>
    <xs:anyAttribute namespace="##any"/>
</xs:complexType>
```

TABLE 7

```
<xs:complexType name="MMTPackageType">
    <xs:sequence>
      <xs:choice maxOccurs="unbounded">
        <xs:element name="title" minOccurs="0"/>
        <xs:element name="packageDescription" minOccurs="0"/>
        <xs:element name="MMT_Package_id" type="xs:string"/>
        <xs:element name="startTime" type="dateTime" minOccurs="0"/>
        <xs:element name="endTime" type="dateTime" minOccurs="0"/>
        <xs:element name="SDPURI" type="xs:anyURI"/>
        <xs:element name="SDP" type="SDPType"/>
        <xs:element name="MMT_signaling_flow_URI" type="xs:anyURI "/>
        <xs:SimpleType name="SDPType">
            <!— Note: the InlinedSDP below must be embedded in a CDATA section ->
            <restriction base="string"/>
        </xs:SimpleType>
        <xs:element name="PI_URI" type="xs:anyURI"/>
      <xs:any namespace="##other" processContents="lax" minOccurs="0"
maxOccurs="unbounded"/>
      </xs:choice>
    </xs:sequence>
    <xs:anyAttribute namespace="##any"/>
</xs:complexType>
</xs:schema>
```

The semantics of the elements included in [Table 6] and [Table 7] are described as follows.

MMTServiceList: an element that provides information about MMT services provided in an MMTP protocol by specific service providers. The MMT receiving entity may specifically request an MMT service list having only a specific channel type, channelType, by an HTTP GET request. Herein, the MMT service list request message may include service_URI and a query string. Service_URI is the URI of an MMT service list storage server that provides the MMT service list, and may be identical to the descriptorURL. The query string may include delivery channel type information, deliveryChannelType. The delivery channel type information, deliveryChannelType, provides the required channel type of MMT packages to be included in the MMT service list transmitted to the MMT receiving entity. The required channel type is a channel type which transmission channels should be in order to consume the MMT packages included in the MMT service list which the MMT sending entity will transmit to the MMT receiving entity. That is, if the MMT service list storage server receives a request using a query string, the MMT service list storage server generates an MMT service list by merging lists of MMT packages consumable only with an indicated channel type (i.e., a delivery channel type deliveryChannelType), and replies to the MMT receiving entity with the MMT service list. If the MMT receiving entity wants a channel list consumable with a specific channel type on the basis of available channels, the MMT receiving entity may request the channel list by using a query string (particularly, the delivery channel type element, deliveryChannelType, included in the query string). In response to an MMT service list request message with no specific query string set, the server may reply to the MMT receiving entity with a full MMT service list which is not limited to a specific channel type.

The syntax of an MMT service list request message according to the present disclosure will be described below. The MMT receiving entity may request an MMT service list by an HTTP GET request message.

In the syntax of the MMT service list request message, request_URI=service_URI "?" query_string. Herein, service_URI: the URI of the MMT service list server that provides MMT service list elements. This can be the same as the descriptorURL, based on its implementation;

query_string: descriptorURL *("&" deliveryChannelType) ("&" channel_range);

descriptorURL: the URL of the MMT service list element for which the MMT receiving entity is requesting the service list element in the query part of the request;

deliveryChannelType: the required channel type of the packages listed in MMT service list which the MMT receiving entity is requesting in the query part of the request;

channel_range: a range of MMT service channel_id;

channel_range=(channelA [channelZ])/(channelA [";"]);

channelA=1×DIGIT; the channel, or the first of a range of channels; and channelZ=1×DIGIT; the last channel of a range of channels.

For example, in the case in which a terminal wants to receive an MMT service with a URI of www.example.com/MMTCH.xml and is capable of accessing only a broadband channel, and thus requests only a corresponding MMT service list, the terminal transmits a request message with channelType=2. The terminal may set a specific channel range. If a channel ID ranges from 1 to 100, and a service URI is http://www.MMTCHdeliveryservice.com/service, an exemplary HTTP GET request message is given as follows.
GET WWW.MMTCHdeliveryservice.com/service?service_URI=www.example.com/MMTCH.xml&deliveryChannelType=2&channel_range=1&channel_range=100 HTTP/1.1

The semantics of the elements included in Table 6 and Table 7 will additionally be described below.

Version: information about the version of MMTServiceList.

DescriptorProvider: an MMT service descriptor information provider.

Duration: an indication indicating how long corresponding list information is valid.

MMTChannel: a logical group expressed as an aggregate of MMT packages.

Name: the name of a specific channel.

Link: the URL of an HTML page including information about the specific channel.

channelDescription: description information about the channel.

releaseDate: the release date of channel information.

lastBuildDate: the last time when information about the channel had been changed.

MMTPackage: a specific program corresponding to an MMT package.

deliveryChannelType: an attribute of type information about a delivery channel, and an indication indicating a channel type required to consume MMT packages (services) listed in the channel. Table 8 below describes the values of deliveryChannelType.

TABLE 8

| deliveryChannelType Value | Description |
| --- | --- |
| 0 | Reserved |
| 1 | Delivery channel for reception only (e.g., broadcasting channel) |
| 2 | Delivery channel for both reception and transmission (e.g., broadband channel) |
| 3 | Having at least one broadcasting channel and at least one broadband channel at the same time | channel_id: a channel ID.

Title: the name of a specific MMT package packageDescription: description of the specific corresponding package.

MMT_Package_id: the ID of the specific package. It uniquely identifies the package in one MMT service list.

startTime: the start time of content which is not a specific MMT package video on demand (VOD) but which is scheduled separately for broadcasting. It is attribute information that can be omitted in the case of a VOD.

endTime: the end time of content which is not a specific MMT package VOD but which is scheduled separately for broadcasting. It is attribute information that can be omitted in the case of a VOD.

SDPURI: URI address information indicating location information about an SDP including session information that the terminal needs to consume the package.

SDP: information about the SDP including the session information that the terminal needs to consume the package.

MMT_Signaling_flow_URI: location information about the flow of MMT signaling message information such as a PA or a PA table.

PI_URI: URI location information including information about a PI page required for the terminal to consume the MMT package.

Now, a description will be given of an apparatus and method for transmitting information related to updating an MMT service list to an MMT receiving entity by an MMT sending entity according to an embodiment of the present disclosure.

The MMT sending entity may deliver information related to updating an MMT service list separately from the MMT service list to the MMT receiving entity by MMT inband signaling. Therefore, the MMT receiving entity may rapidly update the information related to updating the MMT service list, and selectively fetch the updated information.

Specifically, the MMT sending entity may indicate, to a terminal, status information about a change such as new generation, partial alteration, deletion, etc. by a service list (SL) information message. Upon receiving the SL information message, the terminal may check a change in already acquired MMT service list information, or the existence of a new service list. If the terminal wants to, the terminal may request a specific service list to the MMT sending entity for the purpose of updating the service list information.

An embodiment of the SL information message is given in Table 9.

TABLE 9

Table AMD x.x - service list information message

| Syntax | Value | No. of bits | Mnemonic |
|---|---|---|---|
| SL_message ( ) { | | | |
|     message_id | | 16 | uimsbf |
|     version | | 8 | uimsbf |
|     length | | 16 | uimsbf |
|     message_payload{ | | | |
|         num_of_list | N1 | 8 | uimsbf |
|         for (i=0; i<N1; i++) { | | | |
|             MMT_svc_list_URL_length | N2 | 8 | Uimsbf |
|             for (i=0; i<N2; i++) { | | | |
|                 MMT_svc_list_URL_byte | | 8 | uimsbf |
|             } | | | |
|             event_type | | 4 | uimsbf |
|             reserved | '1111' | 4 | uimsbf |
|             If (event_type=='0x02'){ | | | |
|                 num_of_channel | N3 | 8 | uimsbf |
|                 for (i=0; i<N3; i++) { | | | |
|                     channel_id | | 8 | uimsbf |
|                 } | | | |
|             } else If (event_type=='0x03'){ | | | |
|                 MMT_package_id { | | | |
|                     MMT_package_id_length | N4 | 8 | uimsbf |
|                     for (i=0; i<N4; i++) { | | | |
|     MMT_package_id_byte | | 8 | uimsbf |
|                     } | | | |
|                 } | | | |
|             change_time | | 32 | uimsbf |
|             change_delivery_channel_type | | 4 | uimsbf |
|             reserved | '1111' | 4 | uimsbf |
|         } | | | |
|     } | | | |
| } | | | |

The elements of [Table 9] are described below.
message_id: the ID of the message, as long as 16 bits.
Version: information about the version of the message.
Length: the length of the message.
num_of_list: the number of MMT service lists to be delivered to the terminal.
MMT_svc_list_URL_length: the length of an MMT_svc_list_URL string.
MMT_svc_list_URL_byte: the ID of an MMT service list descriptor.
event type: the type of update event.
[Table 10] below describes the values of event_type.

TABLE 10

Table AMD 2.10-Values of event_type

| Value | Description |
|---|---|
| 0x00 | When a specified MMT service list is newly generated |
| 0x01 | When a specified MMT service list is not valid any longer and thus should not be referred to |
| 0x02 | When updated information is present for an indicated channel in a specified MMT service list |
| 0x03 | When it is indicated that delivery channel information about a specific package in a specified MMT service list will be changed at an indicated time, change_time. Therefore, a new MMT service list is to be fetched at the corresponding time and used for an update, and content should be received on the basis of the new information. |
| 0x04~ | Reserved | num_of_channel: the number of channels to which updating has occurred.

channel_id: the ID of a channel.
change_time: a time when the deliveryChannelType of the channel is changed.
change_delivery_channel_type: an indication indicating how the deliveryChannelType of the channel will be changed.

Meanwhile, the transmission side and the reception side may operate on the basis of the information as follows.

The MMT sending entity may operate as follows.

Upon the request of the MMT receiving entity, the MMT sending entity may list only packages that can be serviced with a delivery channel type, deliveryChannelType requested by the MMT receiving entity. Subsequently, the MMT sending entity may configure one or more channels only with the listed packages. The MMT sending entity may configure one service list only with the configured channels, and transmit the configured service list to the MMT receiving entity. If a specific MMT service list is newly generated, changed, or nullified, the MMT sending entity may tag updated contents to each MMT service list. The MMT sending entity may generate an inband SL information message by using the update contents, and transmit the inband SL information message to the terminal. Upon receiving a request for a specific MMT service list or specific channels of the specific MMT service list, the MMT sending entity may transmit the update contents to the terminal.

The MMT receiving entity may operate as follows.

The MMT receiving entity may check its capability. The MMT receiving entity may request a service list, serviceList, from the MMT sending entity on the basis of the capability. The MMT receiving entity may receive service lists that can be consumed with its capability, merge the service lists, and display the merged service list to the user. The MMT receiving entity may fetch each asset of content (an MMT package) selected by the user from the provided service list to a predetermined delivery channel, and reproduce the asset. The MMT receiving entity may determine from the SL information message whether or not a pre-received (by HTTP) specific MMT service list has undergone an update such as new generation, a change, or nullification. If it has determined that there is update information about its capability and an interested channel on the basis of update event type information, event type, about an MMT service list included in the SL information message, the MMT receiving entity may request the information from the MMT sending entity.

While specific embodiments of the present disclosure have been described above, it is obvious that many modifications can be made without departing from the scope of the present disclosure. Therefore, the scope of the present disclosure should be determined by the appended claims and their equivalents, not limited to the foregoing embodiments.

The invention claimed is:

1. A method of providing a media service list, comprising:
   acquiring location information about at least two media service lists;
   receiving the at least two media service lists based on the location information;
   generating an integrated media service list by integrating the received at least two media service lists; and
   displaying the integrated media service list,
   wherein the at least two media service lists comprises at least one motion picture experts group (MPEG) media transport (MMT) service list providing information on MMT services associated with MMT protocol,
   wherein each of the at least two media service lists includes information about a channel type, channelType, indicating a type of a channel required to consume a media service included in a media channel, and
   wherein the integrated media service list is generated by integrating the received at least two media service lists whose channel type is a broadband channel, in case that the broadband channel is available.

2. The method of claim 1,
   wherein each of the at least two media service lists includes one or more media packages, each of the one or more media packages corresponding to one program, and
   wherein each of the at least two media service lists includes one or more media channels, each media channel being a logical group of one or more media packages.

3. The method of claim 2, further comprising:
   requesting the at least two media service lists based on the location information and a delivery channel type, deliveryChannelType,
   wherein the delivery channel type, deliveryChannelType is a required channel type of a media package listed in the received at least two media service lists.

4. The method of claim 2, further comprising receiving a service list information message including information about an update of the received at least two media service lists.

5. The method of claim 4, wherein the service list information message includes an event type, event_type indicating a type of an event that has occurred to the received at least two media service lists.

6. The method of claim 5, further comprising requesting the update of the received at least two media service lists based on of the service list information message.

7. The method of claim 2, wherein if a media package is linear broadcasting, each of the at least two media service lists includes time information about the media package.

8. The method of claim 2, wherein each of the at least two media service lists includes session information corresponding to a media package.

9. The method of claim 1, wherein the integrated media service list is generated on the basis of a current channel availability status.

10. A method of providing a media service list, the method comprising:
    generating at least two media service lists including one or more media packages each corresponding to one program, one or more media channels each being a logical group of one or more media packages, and a channel type, channelType, providing a channel type required for consuming a service included in a media channel; and
    transmitting the generated media service list to a terminal,
    wherein the at least two media service lists comprises at least one motion picture experts group (MPEG) media transport (MMT) service list providing information on MMT services associated with MMT protocol, and
    wherein the channel type is used to generate an integrated media service list, the integrated media service list is generated by integrating the at least two media service lists whose channel type is a broadband channel, in case that the broadband channel is available.

11. The method of claim 10, wherein the channel type of a media package corresponds to a delivery channel type, deliveryChannelType, requested by the terminal.

12. The method of claim 10, wherein if a media package is linear broadcasting, the media service list includes time information about the media package.

13. The method of claim 10, further comprising, if the media service list is updated, transmitting a service list information message including information about the update.

14. The method of claim 13, wherein the service list information message includes an event type, event_type, indicating a type of an event that has occurred to the media service list.

* * * * *